United States Patent [19]

Kamei et al.

[11] 4,125,021

[45] Nov. 14, 1978

[54] APPARATUS FOR DETECTING CONDUCTIVE LIQUID LEVEL

[75] Inventors: Mitsuru Kamei; Uno Osamu; Ogawa Toru, all of Oarai; Ishii Yoichiro, Yokohama; Satomi Masahiro, Hitachi, all of Japan

[73] Assignees: Doryokuro Kakunenryo Kaihatsu Jigyodan, Tokyo; Nisco Kabushiki Kaisha, both of Japan

[21] Appl. No.: 692,023

[22] Filed: Jun. 1, 1976

[51] Int. Cl.² .............................. G01F 23/26
[52] U.S. Cl. .................. 73/304 R; 73/291; 336/75
[58] Field of Search ............... 73/290 R, 291, 304 R; 336/136, 75

[56] References Cited

U.S. PATENT DOCUMENTS

| | | | |
|---|---|---|---|
| 3,058,345 | 10/1962 | Mastras | 73/304 R |
| 3,402,607 | 9/1968 | Cambillard et al. | 73/304 R |
| 3,777,566 | 12/1973 | Marinaccio | 73/290 R |
| 3,834,234 | 9/1974 | Kobayashi et al. | 73/290 R |
| 3,948,100 | 4/1976 | Paris et al. | 73/304 R |
| 3,962,919 | 6/1976 | Playfoot et al. | 73/290 R |

Primary Examiner—Daniel M. Yasich
Attorney, Agent, or Firm—Wenderoth, Lind & Ponack

[57] ABSTRACT

An apparatus for detection of the level of a liquid metal is disclosed. The apparatus has a liquid level detecting probe provided with an exciting coil wound in a closed bottom non-magnetic sheath over the approximately whole length thereof, a level detecting coil wound in the sheath in an upper part thereof, and a temperature compensating coil wound in the sheath in a lower part thereof; a temperature control for maintaining the coils at a constant temperature; a drive circuit for supplying the exciting coil with an alternating current of a determined frequency and amplitude; and a signal processing circuit for subjecting output voltages induced in the liquid level detecting coil and in the temperature compensating coil to linear detection and then determining the ratio of the thus detected outputs, thereby detecting the level of the liquid metal. At the time of operation, the liquid level detecting probe is immersed in the liquid metal the level of which is to be detected in such a manner that the temperature compensating coil is always located below the level of the liquid metal.

13 Claims, 2 Drawing Figures

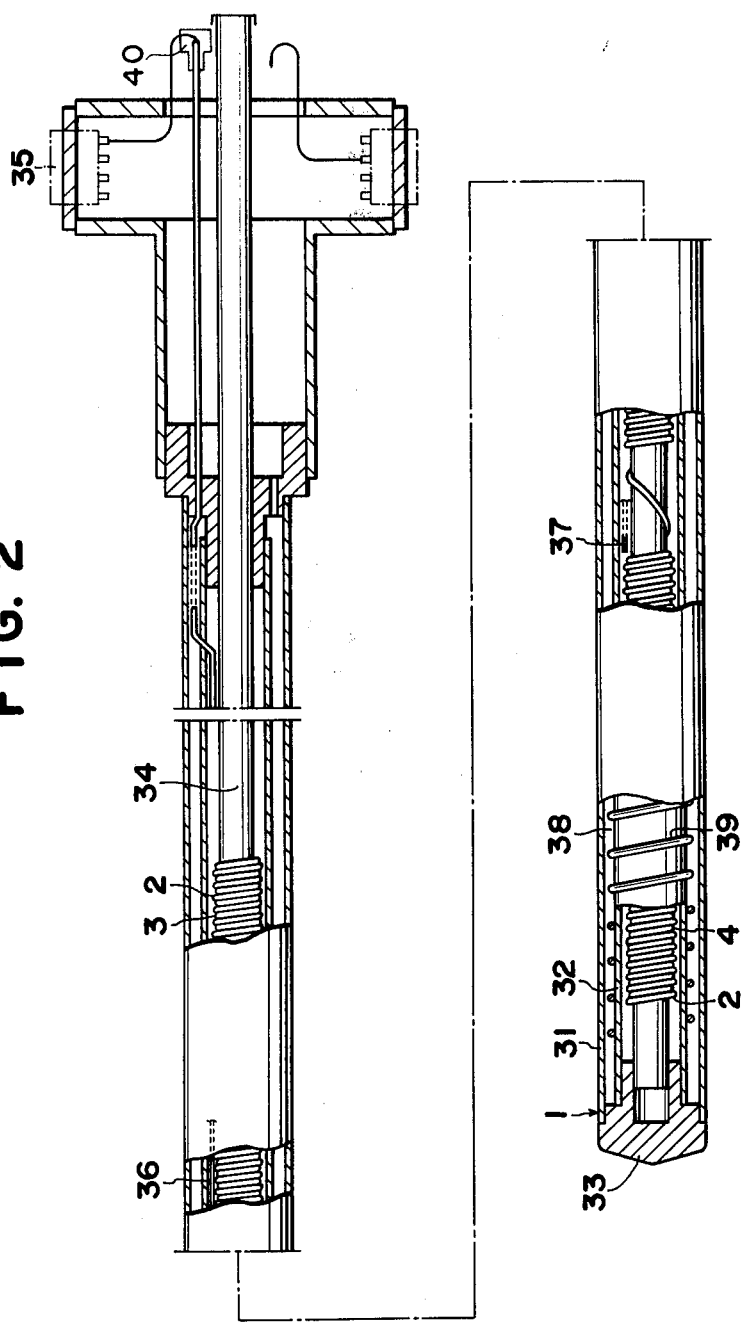

APPARATUS FOR DETECTING CONDUCTIVE LIQUID LEVEL

BACKGROUND OF THE INVENTION

This invention relates to an apparatus for indirect measurement of the level of liquid metals or other electroconductive liquids, and particularly to an apparatus for inductive continuous measurement of the level of a liquid which has automatic temperature compensation.

Liquid metal, particularly liquid sodium, is widely employed as a reactor coolant in a fast breeder reactor and various research facilities related thereto due to the high fluidity and excellent thermal conductivity of such metal, and the measurement and control of the level of the liquid sodium is an important subject from the viewpoint of process control and also of the safety of such facilities.

Various liquid level detectors based on various physical principles have heretofore been developed. Among these prior art detectors, the one considered most promising and actually employed in the above-mentioned field of nuclear facilities is an inductive continuous liquid level detector, which is based on the electroconductivity of liquid metal and functions as follows. A probe provided with a primary coil and a secondary coil in a non-magnetic sheath is dipped in the liquid metal, and the primary coil is supplied with an alternating current from an oscillator to generate induced magnetic flux. Since such magnetic flux gives rise to an eddy current in the liquid metal which has the effect of cancelling the magnetic flux, a change in the liquid level results therefore in a change in a mutual inductance between the primary and secondary coils and thus in the voltage induced in the secondary coil. The detection of the liquid level can therefore be achieved by the measurement of the induced voltage in the secondary coil. An inductive liquid level detector of this type is advantageous in that the measurement can be indirectly achieved without direct contact with the liquid metal since the coils are placed in the non-magnetic sheath, and in the possibility of easy repair since the coils are easily extractable from the sheath. However, the temperatures of liquid metal and gas in the reactor tank are subjected to variations over a rather wide range and are usually mutually different. Due to such temperature variations in liquid metal and gas, there result variations not only in the physical properties of the materials constituting the liquid level detector such as the resistance of coils or the magnetic properties and resistivity of metallic material constituting the sheath, but also the physical properties, particularly the electroconductivity, of the liquid metal itself, thereby rendering exact level detection difficult. Although various methods have heretofore been proposed, no satisfactory solution has been reached for compensating for such errors due to temperature variations. In addition the deposition of evaporated metal on the external surface of the sheath after prolonged operation can be a cause of error in the detection.

As an example of prior art liquid level detectors with a temperature compensation feature, there is a detector consisting of a level detecting probe and a temperature compensating probe both placed in parallel in a tank containing liquid metal as disclosed in the Japanese Patent Official Gazette, Laid-Open Specification No. 48-43367. Both of these probes are provided with a primary and a secondary coils arranged in a sheath, and one of these probes is used as the level detecting probe and the other as the temperature compensating probe. The latter is provided, around said coils, with a 'substitute' metal having the same magnetic permeability as that of the subject liquid metal. The primary coils in both probes are supplied with an output current from an oscillator, and the difference between the voltages induced in the secondary coils of both probes is detected. In such a liquid level detector, the voltage induced in the secondary coil of the temperature compensating probe represents, due to the presence of the substitute metal therearound, a state where the coils are constantly and the temperature compensating probe completely immersed within the liquid metal and does not respond to the variation of the liquid level. Thus, both probes are always under completely identical temperature conditions even when there occurs a change in a temperature distribution resulting from the temperature change as well as from a level change, and any temperature-dependent change in the output voltage of the temperature compensating probe should be equal to any temperature-dependent component of the change in the output voltage of the secondary coil of the level detecting probe, and the level detection can therefore be achieved more accurately by determining the difference between these two induced voltages. Such a liquid level detector, however, inevitably has certain fundamental drawbacks. Firstly, there exists no substitute metal the physical properties of which change in an exactly same manner as those of the subject liquid metal, and for this reason the temperature compensation is merely an approximate and indirect one involving inevitable errors. Secondly, because there is usually a considerable difference between the temperatures of the liquid metal and of the gas in the tank, the probe itself likewise shows a temperature difference between the part thereof immersed in the liquid metal and the remaining non-immersed part. Such a temperature difference as well as the variation of the temperatures of the liquid metal and gas give rise to a change in the magnetic permeability as well as other physical properties of the substitute metal, thus affecting the output voltage of the temperature compensating probe and leading to an error. Thirdly, the presence of two probes which have to be placed in the tank gives rise to a limitation in the tank structure and space required therefor.

In liquid level detection by an inductive level detector, the principal temperature-dependent factors leading to an error can be summarized as follows.

(1) The change of resistance of the coils due to the temperature variation of the liquid metal:

(2) The change of the resistance of coils resulting from the temperature difference between the liquid metal and the gas in the reactor tank:

(3) The change of physical properties, particularly electroconductivity, of the liquid metal itself due to the temperature variation thereof: and (4) The change of electromagnetic properties of the materials constituting the probes due to the temperature variation of the liquid metal.

A complete compensation for such errors has not been achieved in the prior art, primarily due to incomplete analysis of the causes leading to the temperature-dependent error.

SUMMARY OF THE INVENTION

An object of the present invention is to provide a liquid level detecting apparatus capable, by means of a simple structure and handling, of exactly and continuously detecting levels of a liquid metal while taking into consideration all the above-mentioned causes of the temperature-dependent error.

Another object of the present invention is to provide a signal processing system which makes it possible to eliminate the temperature-dependent change of physical properties of the liquid metal itself due to temperature variation thereof.

A further object of the present invention is to provide the liquid level detecting probe which prevents the deposition of a liquid metal on the external surface of the probe thereby making it possible to prevent an error resulting therefrom.

A still further object of the present invention is to provide a liquid level detecting probe having a significantly improved reliability and which is free from breakage of coils due to large temperature changes.

The above described objects have been accomplished in the present invention by providing an apparatus for detection of the level of a liquid metal comprising a liquid level detecting probe provided with an exciting coil wound in a closed bottom non-magnetic sheath over approximately the whole length thereof, a level detecting coil wound in the sheath at an upper part thereof, and a temperature compensating coil wound in the sheath at a lower part thereof; a temperature control means for maintaining the coils at a constant temperature; a drive circuit for supplying the exciting coil with an alternating current of a determined frequency and amplitude; and a signal processing circuit for subjecting output voltages induced in the liquid level detecting coil and in the temperature compensating coil to linear detection and then determining the ratio of thus detected outputs, thereby detecting the level of the liquid metal. During operation, the liquid level detecting probe is immersed in the liquid metal the level of which is to be detected in such a manner that the temperature compensating coil is constantly located below the level of the liquid metal.

BRIEF DESCRIPTION OF THE DRAWINGS

FIG. 2 is a partially broken away elevational view of a liquid level detecting probe according to the present invention.

DESCRIPTION OF THE PREFERRED EMBODIMENT

Figure 1:
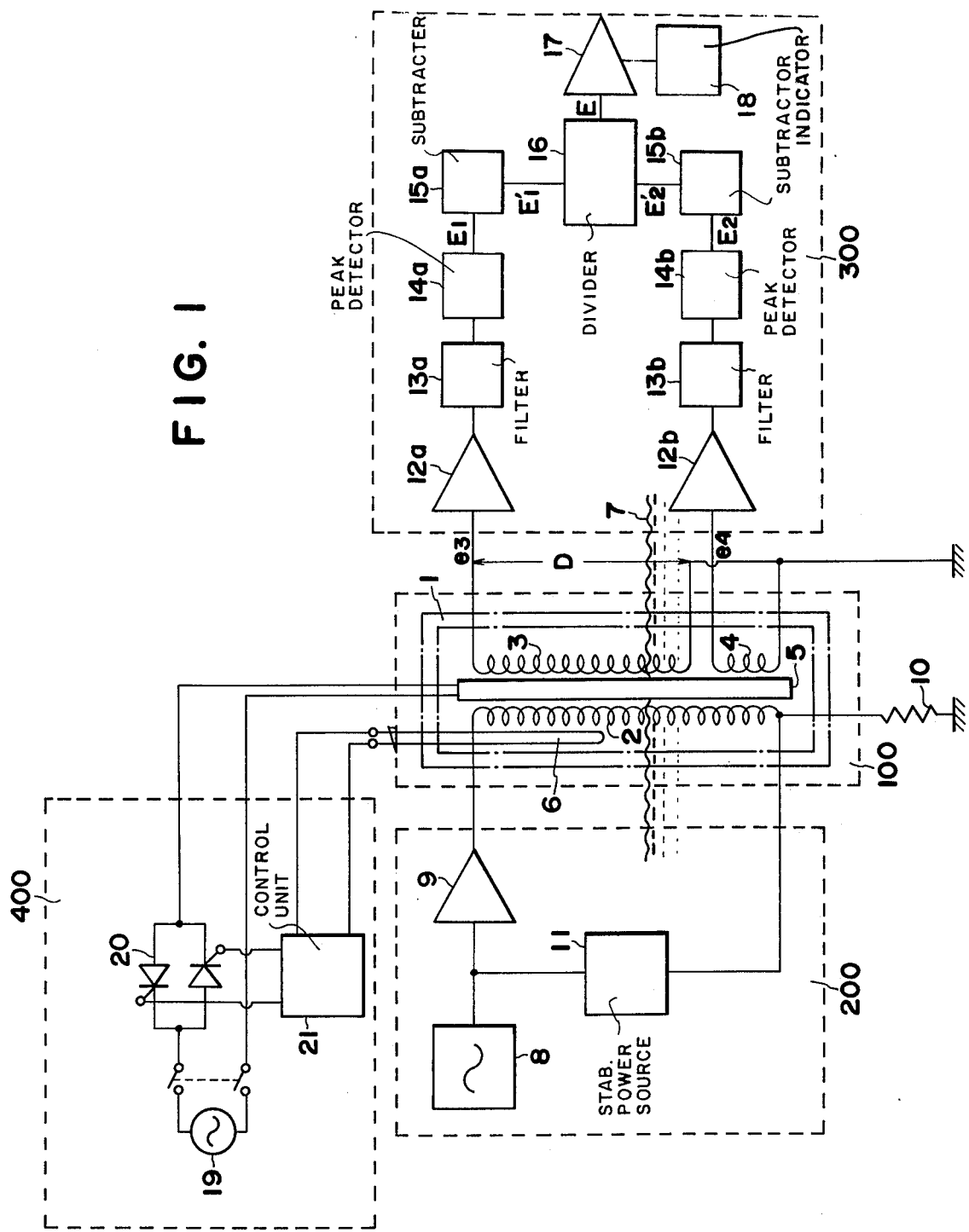
FIG. 1 is a block diagram of an embodiment of the present invention.

Referring to FIG. 1 in the drawngs, there is schematically shown an apparatus according to the present invention consisting of a liquid level detecting probe 100, a drive circuit 200 for an exciting coil, a signal processing circuit 300 and a temperature control circuit 400.

The liquid level detecting probe 100 is provided with a sheath 1 closed at the lowermost extremity thereof and made of non-magnetic material. An exciting coil 2 is wound longitudinally in the sheath over approximately the whole length thereof. At an upper part of the sheath, a level detecting coil 3 is longitudinally wound, and a temperature compensating coil 4 is also longitudinally wound below the level detecting coil 3.

A heating element 5 is further provided in the sheath and extends longitudinally of the probe, and at least one temperature sensing element 6 which cooperates with the heating element 5 at an appropriate position is also provided in the sheath 1. The functions of these elements 5 and 6 are hereinafter described.

Leads from these coils 2, 3, 4 and elements 5, 6 are guided out through the top of the sheath 1 and connected to circuits 200, 300, 400. The probe 100 thus structured is placed in a tank containing liquid metal, and the level detecting range D is limited to the length of the level detecting coil 3. The temperature compensating coil 4 must always be located below the liquid level 7 during the measurement for a reason to be explained hereinafter in connection with the function of the signal processing circuit 300.

The drive circuit 200 for the exciting coil 2 is a constant current circuit composed of an oscillator 8 and a current amplifier 9 connected in series of one end of the exciting coil 2 for supplying a high frequency alternating current thereto, and a current divider 10 and a stabilizing power source 11 connected to the other end of the exciting coil 2. The stabilizing power source 11 is connected to the amplifier 9 to feed back the output of the power source 11 to the amplifier 9. The current divider 10 is a detecting resistor and is placed under a given constant condition outside the sheath 1 in order to avoid fluctuation of the resistance resulting from the effects of ambient temperature, humidity or spontaneous heating. The function of the drive circuit 200 is to supply the exciting coil 2 with an alternating current of a determined frequency and amplitude. Since the exciting coil 2 and the divider 10 are connected in series, the current therein is inversely proportional to the sum of the resistance of the exicting coil 2 and that of divider 10, the terminal potential of which is thus proportional to the current. Any change in the coil resistance due to temperature variation results in a change in the current therein, which in turn varies the terminal potential of the divider 10. The stabilizing power source 11 compares the terminal potential with a predetermined standard voltage, and feeds the difference therebetween to the current amplifier 9 thereby to produce a constant current output from amplifier 9. Although the temperature in the probe 100, particularly in the proximity of the exciting coil 2, is maintained constant by means of the temperature control circuit 400 as described hereinafter, a certain fluctuation of temperature is however inevitable and the current fluctuation resulting therefrom is compensated in this manner.

The signal processing circuit 300 is composed of conventionally known subcircuits as follows. The level detecting coil 3 and the temperature compensating coil 4 are each grounded at one end thereof and connected at the other ends thereof respectively to pre-amplifiers 12a, and 12b, which in turn are connected in series with filters 13a and 13b, rectifiers 14a and 14b, and constant subtractors 15a and 15b respectively, and the outputs of the subtracters are supplied to a divider 16, and the output of the divider is connected to an output amplifier 17 and to an indicator 18 connected in series with the amplifier 17 and which visually indicates a value corresponding to the liquid level. The pre-amplifiers 12a and 12b are provided with a high input impedance in order to avoid the influence of the temperature-dependent fluctuation of the resistance of the coils 3 and 4. The filters 13a and 13b are provided with a frequency band corresponding to the frequency of the drive circuit 200 thereby eliminating the noises contained in the detected signal and improving the signal-to-noise ratio thereof, and the rectifiers, for example peak-value detectors, 14a and 14b subject thus obtained signals to linear detection thereby obtaining direct current signals.

As a liquid metal is an excellent thermal conductor, the local temperature fluctuation therein is very small unless there is a particular flow and the local fluctuation of the physical properties is therefore almost negligible. Although the change in the voltage induced in the level detecting coil 3 is dependent both on the level change and on the change of physical properties of the liquid metal itself resulting from temperature variation thereof, it is possible to detect the level change alone by a suitable processing treatment since the temperature compensating coil 4 detects only the temperature-dependent change in the physical properties, as will be explained in the following.

The magnetic flux generated by supplying the exciting coil 2 with the alternating current can be divided into two types, i.e., one is magnetic flux $\phi_{23}$ generated by the exciting coil 2 and directly linking with the level detecting coil 3, and another is leakage flux $\phi_{2n}$ generated by the exciting coil 2 and linking with the liquid sodium.

The voltage $e_3$ induced in the level detecting coil 3 is expressed as follows:

$$e_3 = -\frac{d\phi_{23}}{dt} - \frac{d\phi_{n3}}{dt} \tag{1}$$

wherein $\phi_{n3}$ indicates magnetic flux generating from the liquid sodium and linking with the level detecting coil 3.

Now, the eddy current $i_{Na}$ produced in the liquid sodium by the exciting coil 2 can be represented by the following equation:

$$i_{Na} = -\frac{L \cdot A}{\rho} \cdot \frac{d\phi_{2n}}{dt} \tag{2}$$

wherein
L: liquid sodium level,
A: equivalent area of liquid sodium receiving the leakage flux, and
$\rho$: specific resistance of liquid sodium.

On the other hand, the magnetic resistance $Zm$ of the magnetic circuit through the liquid sodium and the level detecting coil 3 can be represented as follows:

$$Zm = \frac{1}{\mu \cdot S} \tag{3}$$

wherein
$l$: equivalent length of magnetic path through the level detecting coil and liquid sodium,
$\mu$: permeability of liquid sodium and the sheath, etc. ($\mu \approx 1$),
S: equivalent area of magnetic path through the level detecting coil and liquid sodium.

Consequently, the magnetic flux $\phi_{n3}$ can be expressed by the following equation, which is derived from equations (2) and (3):

$$\phi_{n3} = K \cdot i_{na} \cdot \frac{\mu \cdot S}{l} \tag{4}$$

wherein K is the ratio of the magnetic flux from the liquid sodium and linking with the level detecting coil to the total magnetic flux from the liquid sodium.

Therefore, substitution of equations (2) and (4) into the equation (1) gives $$e_3 = -\frac{d\phi_{23}}{dt} + K\frac{L \cdot A \cdot \mu \cdot S}{\rho \cdot l} \cdot \frac{d^2\phi_{2n}}{dt^2} \tag{5}$$

Similarly, the induced voltage $e_4$ of the temperature compensating coil 4 can be represented as follows:

$$e_4 = -\frac{d\phi_{24}}{dt} + Ko\frac{Lo \cdot Ao \cdot \mu \cdot So}{\rho \cdot Lo} \cdot \frac{d^2\phi_{24n}}{dt^2} \tag{6}$$

wherein
$\phi_{24}$: magnetic flux generated by the exciting coil and directly linking with the temperature compensating coil,
$Ko$: ratio of the magnetic flux from the liquid sodium to the magnetic flux linking with the temperature compensating coil,
$Ao$: equivalent area of liquid sodium receiving the leakage flux,
$So$: equivalent area of magnetic path through the temperature compensating coil and liquid sodium,
$lo$: equivalent length of magnetic path through the temperature compensating coil and liquid sodium, and
$\phi_{24n}$: magnetic flux generated by the exciting coil and linking with the liquid sodium.
$Lo$: effective liquid sodium level of the temperature compensating coil.

Since the temperature compensating coil 4 is provided below the level detecting coil 3 in the sheath 1 and is always located below the liquid sodium level 7, the coefficients $Ko$, $Lo$, $Ao$, $So$ and $lo$ are almost constant, the specific resistance $\rho$ of liquid sodium is changeable due to temperature changes. Further, in equations (5) and (6), the respective first terms of the right sides, i.e. $d\phi_{23}/dt$ and $d\phi_{24}/dt$, are both constants which are inherently determined depending upon the shape and material of the level detecting probe used and the exciting current applied, regardless of the existence of liquid sodium. The respective second terms of the right sides are zero when liquid sodium is not present.

Therefore, by previously measuring, in the atmosphere, the induced voltage $-(d\phi_{23}/dt)$ in the level detecting coil 3 and the induced voltage $-(d\phi_{24}/dt)$ in the temperature compensating coil 4, and by substracting these values from the equations (5) and (6) respectively, the following equations are obtained:

$$e'_3 = K\frac{L \cdot A \cdot \mu \cdot S}{\rho \cdot L} \cdot \frac{d^2\phi_{2n}}{dt^2} \tag{7}$$

$$e'_4 = Ko\frac{Lo \cdot Ao \cdot \mu \cdot So}{\rho \cdot Lo} \cdot \frac{d^2\phi_{24n}}{dt^2} \tag{8}$$

Then, by dividing the equation (7) by the equation (8), the following equation (9) can be obtained, and thus the specific resistance $\rho$ of liquid sodium, which is considerably affected by temperature changes thereof, can be eliminated.

$$\frac{e'_3}{e'_4} = \frac{K \cdot L \cdot A \cdot S \cdot lo}{Ko \cdot Lo \cdot Ao \cdot So \cdot l} \cdot \frac{\frac{d^2\phi_{2n}}{dt^2}}{\frac{d^2\phi_{24n}}{dt^2}} \tag{9}$$

The other coefficients K, A, S, $l$, Ko, Ao, So and lo are nearly constant, since these have negligibly small temperature dependence in comparison with $\rho$. The effective value of the ratio of $$\frac{d^2\phi_{2n}}{dt^2} \bigg/ \frac{d^2\phi_{24n}}{dt^2}$$

is also constant, since both $\phi_{2n}$ and $\phi_{24n}$ are sine waves generated by the exciting current from the stablized power source. It is therefore apparent that the ratio $e_3'/e_4'$ in equation (9) is finally proportional to the liquid sodium level L.

Now, referring again to the signal processing circuit 300 shown in FIG. 1, the alternating voltages $e_e$ in equation (5) and $e_4$ in equation (6) are induced in the level detecting coil 3 and the temperature compensating coil 4 respectively, when the exciting coil 2 is supplied with the exciting current having a constant frequency and amplitude in a normal operation. These induced voltages $e_3$ and $e_4$ are linearly amplified by means of the pre-amplifiers 12a and 12b, and then noises contained in the signals are eliminated by means of the filters 13a and 13b. The thus amplified signals are linearly detected by the rectifiers 14a and 14b respectively, and are converted to DC outputs $E_1$ and $E_2$, the values of which are proportional to peak values of the induced voltages $e_3$ and $e_4$ respectively. These DC outputs $E_1$ and $E_2$ are then introduced to the constant subtractors 15a and 15b, wherein the values corresponding to $d\phi_{23}/dt$ in equation (5) and $d\phi_{24}/dt$ in equation (6) are subtracted to thereby obtain the outputs $E_1'$ and $E_2'$ corresponding to peak values of $e_3'$ in equation (7) and $e_4'$ in equation (8), respectively. The output voltage E is provided by dividing $E_1'$ by $E_2'$ by using the divider 16. As is explained in connection with the equation (9) above described, the specific resistance $\rho$ of liquid sodium can thus be eliminated from the output voltage E. The output voltage E is suitably amplified by the output amplifier 17, and is then introduced to the indicator 18 which can visually and accurately indicate a value corresponding to the liquid level independently of variations in the physical properties of liquid sodium due to temperature changes thereof.

The temperature control circuit 400 functions to maintain the interior of the probe 100, particularly the coils 2, 3 and 4, at a constant temperature and is composed of a heating element 5 provided in the sheath 1 which is connected to an alternating current supply 19 through a silicon controlled rectifier unit 20, and at least one temperature sensing element 6 the output of which is compared with a predetermined value in a control unit 21 for controlling the silicon controlled unit 20. Thus, the circuit 400 can control the current to the heating element 5 according to the signals obtained from the temperature sensing element 6 to thereby maintain the coils at a temperature. In order to maintain the constant temperature substantially perfectly constant, it is preferred to provide a plurality of temperature sensing elements 6 in the sheath 1 at appropriate positions longitudinally thereof.

The temperature in the probe is preferably maintained approximately 50° C. higher than the maximum temperature of the liquid metal expected at the position of the probe.

With the structure described hereinbefore, it is possible to maintain the constituent materials of the probe, particularly the coils therein, at a constant temperature, and to maintain the resistance of the coils constant. Such maintenance of the temperature in the probe prevents the breakage of the coils due to sharp temperature changes, and also prevents the deposition of the liquid metal on the external surface of the sheath. Furthermore any fluctuation in the resistance is compensated by the constant current drive circuit 200. In this manner the induction flux generated by the exciting coil is maintained constant regardless of the temperature or the level of the liquid metal, thus avoiding any error which may result therefrom. Consequently the voltages induced in the level detecting coil and in the temperature compensating coil are exclusively dependent on the temperature-dependent physical properties of the liquid metal and the level thereof, the former of which can be eliminated by the dividing process described hereinbefore to obtain information indicating the exact liquid level.

The detailed structure of a preferred embodiment of the level detecting probe 100 is described in the following with reference to FIG. 2. The sheath 1 of non-magnetic stainless steel is composed of a well 31, a guide tube 32 extending coaxially thereof and an end bushing 33 provided at the open end thereof. The exciting coil 2 is wound around a sheathed resistance heater 34 over approximately the whole length thereof. At the upper part of the heater 34 is wound the liquid level detecting coil 3 to form a pair with the exciting coil 2, and at the lower part of the heater 34 is also wound the temperature compensating coil 4 to form a pair with the exciting coil 2. The sheathed heater 34 with the coils 2, 3 and 4 thus wound therearound is inserted into said sheath 1. The coil leads 40 are guided to the outside of the sheath through a suitable connector member 35. Although the detection range becomes wider as the level detecting coil 3 is made longer, an unduly short temperature compensating coil 4 is unable to function satisfactorily for the signal processing. For this reason the ratio, in this embodiment, of the lengths of the level detecting coil 3 and the temperature compensating coil 4 is preferably selected to be 10:1. As the present probe has a total length of about 3 meters in which said coils extend longitudinally over a length of about 2 meters, there are provided two thermocouples 36 and 37 in the proximity of said coils for exact temperature sensing. The space between the well 31 and the guide pipe 32 is filled with heat-insulating gas such as air, in order to form an insulating layer 38 as the liquid metal is highly heat-conductive and easily removes the heat from the probe.

Furthermore the probe shown in FIG. 2 is with an auxiliary heater 39 wound around the lower part of said guide pipe 32 in order to prevent the scattering of heat particularly below the liquid level by means of heating by said sheathed heater 34 and auxiliary heater 39.

Furthermore it is possible to provide, in the sheath of sheathed heater 34 on which the coils are provided, a plurality of heaters which are respectively combined with plural temperature control circuits and plural temperature sensing elements placed in the vicinity of the coils for independent temperature control, thereby enabling differential heating above and below the level of the liquid metal and realizing uniform temperature over a long coil despite significant fluctuation of the liquid level.

What we claim are:

1. An apparatus for detection of the level of a liquid metal comprising:

(a) a liquid level detecting probe having a closed bottom non-magnetic sheath, an exciting coil within said sheath and extending longitudinally over substantially the whole length of said sheath, a liquid level detecting coil extending longitudinally within an upper part of said sheath, a temperature compensating coil extending longitudinally within said sheath below said liquid level detecting coil, a heating element extending longitudinally within said sheath, and at least one temperature sensing element provided in an appropriate position to sense the temperature of said coils in said sheath, said probe during use being immersed in the liquid metal the level of which is to be detected to a depth such that said temperature compensating coil is always located below the level of said liquid metal;

(b) a temperature control circuit coupled to said heating element and to said temperature sensing element for controlling the supply of current to said heating element in response to the signals from said temperature sensing element for maintaining said coils at a constant temperature and thereby preventing changes of resistance of said coils;

(c) a drive circuit coupled to said exciting coil for supplying said exciting coil with an alternating current having a determined frequency and amplitude; and (d) a signal processing circuit having a first series connected amplifier, filter, rectifier and subtracter connected to the output of said liquid level detecting coil, a second series connected amplifier, filter, rectifier and subtracter connected to the output of said temperature compensating coil for linearly detecting voltages induced in said level detecting coil and said temperature compensating coil and subtracting therefrom predetermined voltages equal to the linearly detected voltages induced in the level detecting coil and the temperature compensating coil, respectively, by the alternating current supplied to said exciting coil by said drive circuit when said level detecting probe is in the atmosphere, a divider connected to said subtracters for determining the ratio of the outputs from said subtracters, and an indicator coupled to said divider for visually indicating said ratio, whereby the output of the signal processing circuit is proportional to the exact level of the liquid metal and independent of the temperature changes thereof.

2. An apparatus according to claim 1, wherein said heating element is a sheathed heater, said exciting coil is wound thereon over the approximately whole length thereof, said liquid level detecting coil is wound around said sheathed heater in an upper part thereof to form a pair with said exciting coil, and said temperature compensating coil is wound around said sheathed heater at a lower part thereof to form a pair with said exciting coil.

3. An apparatus according to claim 2, wherein said temperature sensing element is provided in the vicinity of said coils wound around said sheathed heater.

4. An apparatus according to claim 2, wherein said sheathed heater is divided into a plurality of portions arranged in the longitudinal direction thereof, each of said portions being provided with a temperature sensing element in the vicinity of the corresponding portion of said coils and an independent temperature control circuit for such portion.

5. An apparatus according to claim 1, wherein the ratio of the lengths of said liquid level detecting coil and of said temperature compensating coil is 10:1.

6. An apparatus according to claim 1, wherein said sheath is composed of an outer tube and an inner tube with a space therebetween.

7. An apparatus according to claim 6 wherein said space between said outer tube and said inner tube is filled with a heat insulating gas.

8. An apparatus according to claim 6 further comprising an auxiliary coil heater in a lower part of said space between said outer tube and said inner tube.

9. An apparatus according to claim 1, wherein said temperature control circuit comprises an alternating current source, a silicon controlled rectifier unit having gate terminals, and a control unit, said alternating current source being connected to said heating element through said silicon controlled rectifier unit, said control unit being coupled between the output of said temperature sensing element and the gate terminals of said silicon controlled rectifier unit and including means for comparing the temperature detected by the temperature sensing element with a predetermined temperature and controlling the gate current of the silicon controlled rectifier unit, thereby controlling the alternating current to the heating element.

10. An apparatus according to claim 9 wherein said predetermined temperature is higher than the predicted maximum temperature of said liquid metal.

11. An apparatus according to claim 1, wherein said drive circuit comprises an oscillator, a current amplifier, said oscillator being connected to one end of said exciting coil through said current amplifier, a current divider connected to the other end of said exciting coil, and a stabilized power source connected to said other end of said exciting coil, said power source being further connected with said current amplifier so as to feed back the output of said power source to said amplifier.

12. An apparatus according to claim 11, wherein said current divider is at a determined temperature and humidity.

13. An apparatus according to claim 1, wherein said amplifiers have a high input impedance.

* * * * *